United States Patent
Kubotera (10) Patent No.: US 8,369,518 B2
(45) Date of Patent: Feb. 5, 2013

(54) ELECTRONIC DATA ENCRYPTION AND ENCRYPTED DATA DECRYPTION SYSTEM, AND ITS METHOD

(75) Inventor: Norikazu Kubotera, Tokyo (JP)

(73) Assignee: NEC Corporation, Tokyo (JP)

( * ) Notice: Subject to any disclaimer, the term of this patent is extended or adjusted under 35 U.S.C. 154(b) by 397 days.

(21) Appl. No.: 12/664,249

(22) PCT Filed: Jun. 18, 2008

(86) PCT No.: PCT/JP2008/061124
§ 371 (c)(1),
(2), (4) Date: Dec. 11, 2009

(87) PCT Pub. No.: WO2008/156107
PCT Pub. Date: Dec. 24, 2008

(65) Prior Publication Data
US 2010/0195830 A1     Aug. 5, 2010

(30) Foreign Application Priority Data

Jun. 18, 2007  (JP) .................................. 2007-160193

(51) Int. Cl.
*H04L 9/30* (2006.01)
(52) U.S. Cl. ........................... 380/30; 380/283; 713/171
(58) Field of Classification Search .............. 380/44–47, 380/283, 255
See application file for complete search history.

(56) References Cited

U.S. PATENT DOCUMENTS

| | | | | |
|---|---|---|---|---|
| 5,202,922 | A * | 4/1993 | Iijima | 380/45 |
| 6,169,803 | B1 * | 1/2001 | Sako et al. | 380/44 |
| 2003/0044019 | A1 * | 3/2003 | Vanstone et al. | 380/277 |

FOREIGN PATENT DOCUMENTS

| | | |
|---|---|---|
| JP | 11-55244 A | 2/1999 |
| JP | 11-85015 A | 3/1999 |

(Continued)

OTHER PUBLICATIONS

International Search Report for PCT/JP2008/061124 mailed Sep. 9, 2008.

(Continued)

*Primary Examiner* — Glberto Barron, Jr.
*Assistant Examiner* — David Le (57) ABSTRACT

An object of the present invention is to provide an electronic data encryption and decryption system allowing a privileged user to decrypt all encrypted data without using a plurality of secret keys but only by using a single secret key that the privileged user himself has. An electronic data encryption and decryption system includes: a privileged user device, a user device, and an encrypted data generation device. The privileged user device has: a privileged user key generation means for generating a privileged user secret key x and a privileged user public key x·P (P is a generator); a first session key generation means for generating a session key K; and a first decryption means for decrypting the encrypted data by using the session key K generated by the first session key generation means. The user device has: a user key generation means for generating a user secret key r, a user public key r·P, and a public key rx·P; a second session key generation means for generating the session key K; and a second decryption means for decrypting the encrypted data by using the session key K generated by the second session key generation means. The encrypted data generation device has: a third session key generation means for generating the session key K by using the public key rx·P, session key generation information s, and a random point Q; and a means for encrypting the input electronic data by using the session key K generated by the third session key generation means.

20 Claims, 4 Drawing Sheets

FOREIGN PATENT DOCUMENTS

| | | |
|---|---|---|
| JP | 11-95659 A | 4/1999 |
| JP | 11-161167 A | 6/1999 |
| JP | 2000172174 A | 6/2000 |
| JP | 2002057660 A | 2/2002 |
| JP | 2002217885 A | 8/2002 |
| JP | 2002252609 A | 9/2002 |
| JP | 2005141200 A | 6/2005 |
| JP | 2006109244 A | 4/2006 |

OTHER PUBLICATIONS

A. Joux, "A One Round Protocol for Tripartite Diffie-Hellman", Lecture Notes in Computer Science, 1838, Springer, Jul. 24, 2000, pp. 385-393.

L. Wang et al., "Multi-Keys Tripartite Key Agreement from Pairing"; The 2005 Symposium on Cryptography and Information Security, The Institute of Electronics, Information and Communication Engineers, Jan. 25, 2005, 4F1-5.

* cited by examiner

ELECTRONIC DATA ENCRYPTION AND ENCRYPTED DATA DECRYPTION SYSTEM, AND ITS METHOD

This application is the National Phase of PCT/JP2008/061124, filed Jun. 18, 2008, which is based upon and claims the benefit of priority from prior Japanese Patent Application No. 2007-160193 (filed Jun. 18, 2007) under the Paris Convention, the entire contents of which are incorporated in the present specification by reference.

TECHNICAL FIELD

The present invention relates to an electronic data encryption and decryption system and its method.

BACKGROUND ART

At present, electronic data is often encrypted for transmission in order to prevent the content thereof from being leaked.

For data encryption, two basic encryption methods, a symmetric encryption method (secret key encryption method) and an asymmetric encryption method (public key encryption method), are generally used.

The symmetric encryption method uses a common secret key for both encryption and decryption.

The asymmetric encryption method uses a pair of asymmetric keys.

More specifically, the asymmetric encryption method uses one secret key and one public key. Data encrypted by the public key can be decrypted only by the corresponding secret key.

Organizations such as companies and public offices retain confidential information and need to manage the confidential information.

However, there is a danger that an organization insider may encrypt confidential information and transmit it to others.

In this case, since the data has been encrypted, it is difficult to determine whether the transmitted data is confidential information or not.

Thus, there is a possibility that the organization may be unaware of the leakage of confidential information, if occurs.

In order to avoid this, a system needs to be established in which a confidential information manager (hereinafter, referred to as "privileged user") of an organization can decrypt encrypted data irrespective of the intentions of a transmitter and a receiver and confirm whether the content of transmitted data includes confidential information or not.

Examples of a conventional method for the privileged user to decrypt encrypted electronic data are disclosed in PTL 1 and PTL 2.

Use of the method disclosed in PTL 1 allows the privileged user to decrypt encrypted electronic data.

However, in the method disclosed in PTL 1, it is necessary for the privileged user to retain and manage all information concerning the secret keys of users of the encryption system, making the key management work cumbersome and complicated.

The reason for the above is that the privileged user needs to mange information of individual secret keys of the users of the encryption system.

Use of the method disclosed in PTL 2 allows the privileged user to decrypt encrypted electronic data without a need to manage the secret keys of the users of the encryption system.

However, the privileged user needs to manage his own secret key. In addition, each of the encryption system users needs to manage two secret keys. Further, for electronic data encryption, each of the encryption system users needs to acquire four public keys.

The reason for the above is that since there does not exist a key for decrypting encrypted data but a pair of secret and public keys, it is necessary to create a pair of secret and public keys every time required.

CITATION LIST

Patent Literature

{PTL 1} JP-A-11-055244
{PTL 2} JP-A-11-085015

SUMMARY OF INVENTION

Technical Problem

As described above, in order to transmit electronic data without allowing a third party to access the content thereof, a method that encrypts electronic data and then transmits it is effective.

However, there is a danger that any company insider may encrypt confidential information by using an encryption technique for the wrong purpose and transmit it to others.

Therefore, a confidential information manager of a company or the like needs to decrypt data encrypted by the company insider so as to confirm the content thereof.

In this regard, although there is known a method for the privileged user to decrypt the encrypted data, a plurality of encryption and decryption keys are required, making the key management work cumbersome and complicated.

An object of the present invention is therefore to provide an electronic data encryption and decryption system and its method allowing the privileged user to decrypt all encrypted data without using a plurality of secret keys but only by using a single secret key that the privileged user himself has.

Solution to Problem

According to the present invention, there is provided an electronic data encryption and decryption system that includes: a privileged user device including, a privileged user key generation unit for generating a privileged user secret key x and a privileged user public key x·P (P is a generator), a first session key generation unit for generating a session key K, and a first decryption unit for decrypting encrypted data by using the session key K generated by the first session key generation unit; a user device including, a user key generation unit for generating a user secret key r, a user public key r·P, and a public Key rx·P, a second session key generation unit for generating the session key K, and a second decryption unit for decrypting the encrypted data by using the session key K generated by the second session key generation unit; and an encrypted data generation device including, a third session key generation unit for generating a session key K by using the public key rx·P, session key generation information s and a random point Q, and a unit for encrypting input electronic data using the session key K generated by the third session key generation unit.

Further, according to the present invention, there is provided a privileged user device that includes: a privileged user key generation unit for generating a privileged user secret key x and a privileged user public key x·P (P is a generator); a session key generation unit for generating a session key K;

and a decryption unit for decrypting encrypted data by using the session key K generated by the session key generation unit.

Further, according to the present invention, there is provided a user device that includes: a user key generation unit for generating a user secret key r, a user public key r·P (P is a generator), and a public key rx·P (x is a privileged user secret key); a session key generation unit for generating a session key K; and a decryption means unit for decrypting the encrypted data by using the session key K generated by the session key generation unit.

Further, according to the present invention, there is provided an encrypted data generation device that includes: a session key generation unit for generating a session key K by using a public key rx·P (r is a user secret key, x is a privileged user secret key, and P is a generator), session key generation information s and a random point Q; and a unit for encrypting input electronic data using the session key K generated by the session key generation unit.

Further, according to the present invention, there is provided a record medium on which a computer program is recorded, said computer program comprising instructions for having a computer function as a privileged user device, the privileged user device including: a privileged user key generation unit for generating a privileged user secret key x and a privileged user public key x·P (P is a generator); a session key generation unit for generating a session key K; and a decryption unit for decrypting encrypted data by using the session key K generated by the session key generation unit.

Further, according to the present invention, there is provided a record medium on which a computer program is recorded, said computer program comprising instructions for having a computer function as a user device, the user device including: a user key generation unit for generating a user secret key r, a user public key r·P (P is a generator), and a public key rx·P (x is a privileged user secret key); a session key generation unit for generating a session key K; and a decryption unit for decrypting the encrypted data by using the session key K generated by the session key generation unit Further, according to the present invention, there is provided a record medium on which a computer program is recorded, said computer program comprising instructions for having a computer function as an encrypted data generation device, the encrypted data generation device including: a session key generation unit for generating a session key K by using a public key rx·P (r is a user secret key, x is a privileged user secret key, and P is a generator), session key generation information s and a random point Q; and unit for encrypting input electronic data using the session key K generated by the session key generation unit.

Further, according to the present invention, there is provided an electronic data encryption and decryption method that includes: a privileged user key generation step of generating a privileged user secret key x and a privileged user public key x·P (P is a generator); a first session key generation step of generating a session key K; a first decryption step of decrypting encrypted data by using the session key K generated by the first session key generation step; a user key generation step of generating a user secret key r, a user public key r·P, and a public key rx·P; a second session key generation step of generating the session key K; a second decryption step of decrypting the encrypted data by using the session key K generated by the second session key generation step; a third session key generation step of generating a session key K by using the public key rx·P, session key generation information s and a random point Q; and a step of encrypting input electronic data using the session key K generated by the third session key generation step.

Advantageous Effects of Invention

According to the present invention, it is possible to allow the privileged user to decrypt all encrypted data without using a plurality of secret keys but only by using a single secret key that the privileged user himself has.

DESCRIPTION OF EMBODIMENTS

A preferred embodiment of the present invention will be described in detail below with reference to the accompanying drawings.

Figure 1:
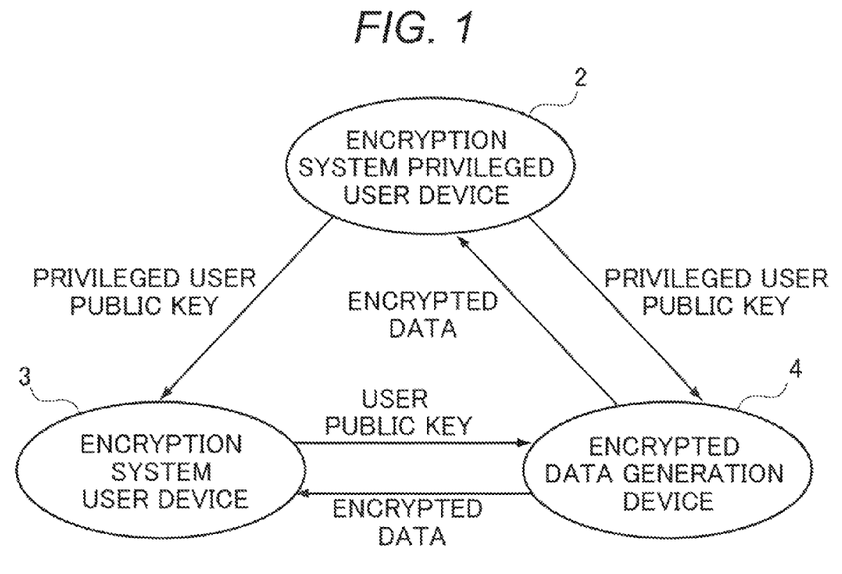
FIG. 1 A block diagram showing an electronic data encryption and decryption system according to an embodiment of the present invention.

First, a structure of the present embodiment will be described with reference to FIG. 1. An electronic data encryption and decryption system according to the embodiment of the present invention includes an encryption system privileged user device 2, an encryption system user device 3, and an encrypted data generation device 4.

The encryption system privileged user device 2 is a device used by an encryption system privileged user.

The encryption system privileged user device 2 retains a privileged user secret key x and provides a privileged user public key x·P (P is a generator) to the encryption system user device 3 and encrypted data generation device 4.

Further, the encryption system privileged user device 2 decrypts encrypted data generated by the encrypted data generation device 4.

The encryption system user device 3 retains a user secret key r, a user public key r·P, a privileged user public key x·P, and a public key rx·P and provides the user public key r·P and public key rx·P to the encrypted data generation device 4.

The encryption system user device 3 decrypts encrypted data generated by the encrypted data generation device 4.

The encrypted data generation device 4 is a device used by a user who generates encrypted data.

The encrypted data generation device 4 retains the privileged user public key x·P provided from the encryption system privileged user device 2 and retains the user public key r·P and public key rx·P provided from the encryption system user device 3.

The encrypted data generation device 4 generates a session key (temporary key) K and uses the session key K to encrypt electronic data.

Next, structures of the respective devices will be described with reference to the drawings.

Figure 2:
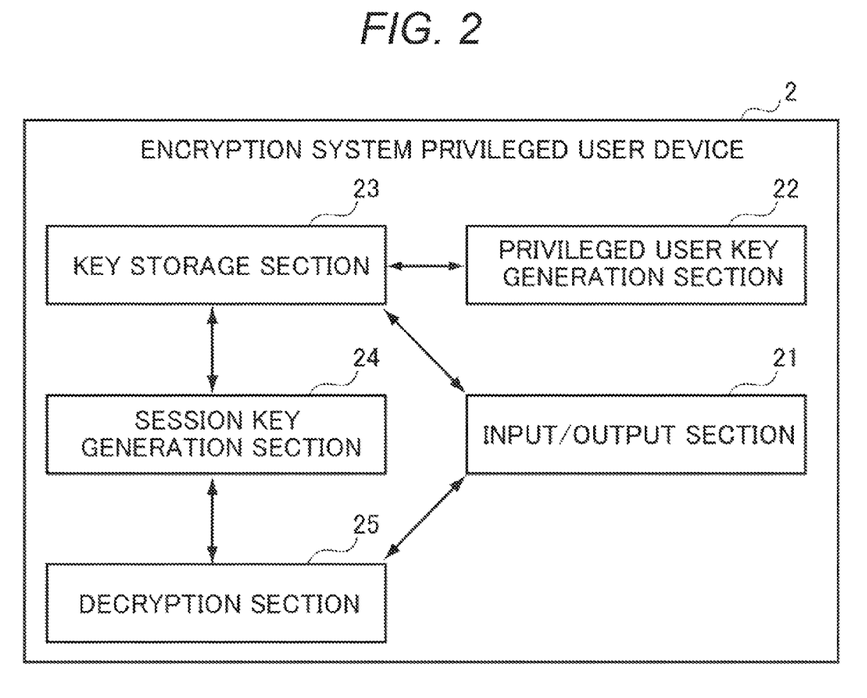
FIG. 2 A block diagram showing a structure of an encryption system privileged user device shown in FIG. 1.

First, with reference to FIG. 2, a structure of the encryption system privileged user device 2 will be described.

The encryption system privileged user device 2 includes an input/output section 21, a privileged user key generation section 22, a key storage section 23, a session key generation section 24, and a decryption section 25.

The input/output section 21 performs input of encrypted data and output of decrypted data and performs output of the privileged user public key x·P. Further, the input/output section 21 receives information from the privileged user through a keyboard or the like.

The privileged user key generation section 22 generates the privileged user secret key x and privileged user public key x·P. The privileged user secret key x is selected from one of the elements of a cyclic multiplicative group Zq of an order q.

A privileged user public key Ppub is one element of a cyclic multiplicative group G of an order q. The cyclic multiplicative group G is an elliptic curve or hyperelliptic curve Jacobian and is generated with a generator set as P. Further, the cyclic multiplicative group G has bilinear pairs e.

Here, the bilinear pairs e satisfy the following proposition.

$$G \times G \rightarrow Zq \quad \text{[Numeral Expression 1]}$$

where G is a cyclic multiplicative group, × denotes a direct product, → denotes a mapping, and Zq is a mapping of G×G.

The privileged user public key Ppub is generated by multiplying the privileged user secret key x and generator P. The generated privileged user secret key x and privileged user public key Ppub are stored in the key storage section 23.

Here, the bilinear pairs will be described.

Weil pairs and Tate pairs, which are algebraic curves, are very important in the study of algebraic geometry.

The initial application of the bilinear pairs was used for evaluating a discrete logarithm problem in an encryption system.

For example, MOV attack using the Weil pairs and FR attack using the Tate pairs have reduced a discrete logarithm problem in a specific elliptic curve or hyperelliptic curve to a discrete logarithm problem in a finite field.

In recent years, it has become clear that the bilinear pairs can be applied variously in cryptography.

The bilinear pairs e that satisfy the above proposition further satisfy the following conditions.

$$e(P1+P2,Q)=e(P1,Q)e(P2,Q) \quad \text{[Numeral Expression 2]}$$

and $$e(P,Q1+Q2)=e(P,Q1)e(P,Q2) \quad \text{[Numeral Expression 3]}$$

or $$e(aP,bQ)=(eP,Q)ab \quad \text{[Numeral Expression 4]}$$

In addition, $$e(P,Q) \neq 1 \quad \text{[Numeral Expression 5]}$$

$$P \in G, Q \in G \quad \text{[Numeral Expression 6]}$$

(where G is a cyclic multiplicative group)
existence of Numeral Expression 6 that satisfies Numeral Expression 5 is required.

The session key generation section 24 uses session key information sr·P (to be described later) added to encrypted data, a privileged user secret key x, and a random point Q (to be described later) to generate a session key K. The generated session key is provided to the decryption section 25.

The decryption section 25 uses the session key K provided from the session key generation section 24 to decrypt encrypted data.

Next, with reference to FIG. 3, a structure of the encryption system user device 3 will be described.

Figure 3:
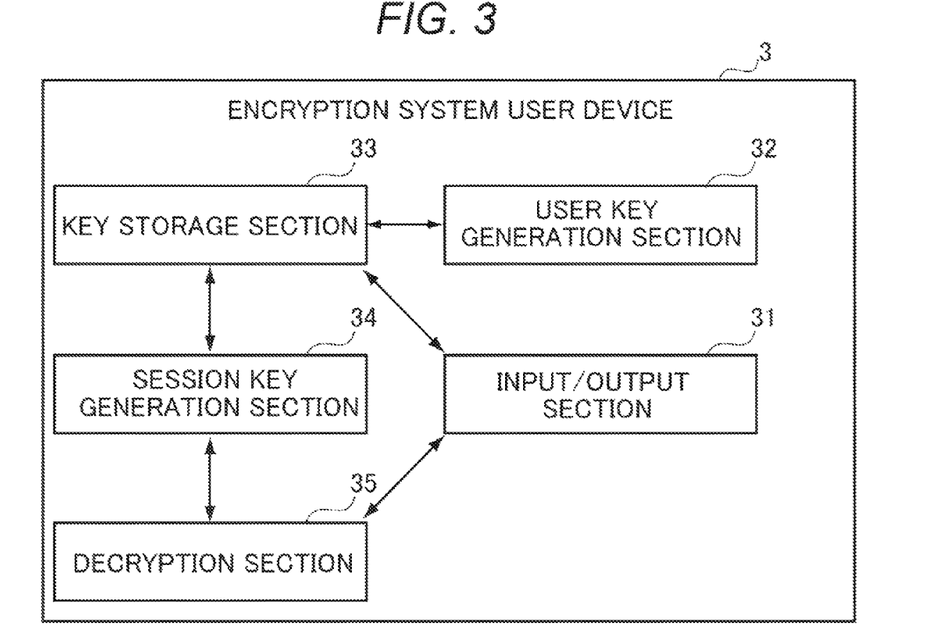
FIG. 3 A block diagram showing a structure of an encryption system user device shown in FIG. 1.

As shown in FIG. 3, the encryption system user device 3 includes an input/output section 31, a user key generation section 32, a key storage section 33, a session key generation section 34, and a decryption section 35.

The input/output section 31 performs input of encrypted data, output of decrypted data, output of the user public key r·P, input of the privileged user public key x·P, and output of the public key rx·P. Further, the input/output section 31 receives information from the user through a keyboard or the like.

The user key generation section 32 generates the user secret key r and user public key r·P. As is the case with the privileged user secret key x, the user secret key r is selected from one of the elements of a cyclic multiplicative group Zq of an order q.

A broadly-defined user public key Upub is an element of a cyclic multiplicative group G of an order q and is generated as a set of a narrowly-defined user public key r·P and public key rx·P. r denotes a user secret key, P denotes a generator, and x denotes a privileged user secret key. rx·P can be obtained by multiplying the privileged user public key x·P by r from the left. Since the values of rx and x have been multiplied by "·P", they cannot be decrypted by the encrypted data generation device 4.

The generated user secret key r and user public key Upub are provided to the key storage section 33.

The key storage section 33 stores the user secret key r and broadly-defined user public key Upub (a set of the narrowly-defined user public key r·P and public key rx·P) that has been generated by the user key generation section 32.

The session key generation section 34 uses session key information sx·P (to be described later) added to encrypted data, a user secret key r, and a random point Q (to be described later) to generate a session key K. The generated session key K is provided to the decryption section 35.

The decryption section 35 uses the session key K provided from the session key generation section 34 to decrypt encrypted data.

Figure 4:
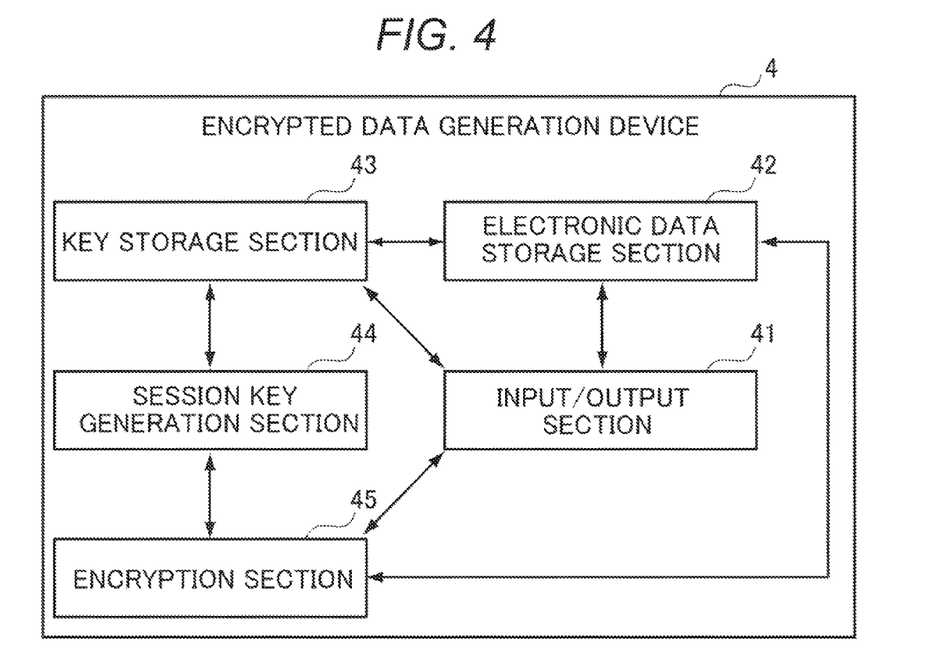
FIG. 4 A block diagram showing a structure of an encrypted data generation device in FIG. 1.

Next, with reference to FIG. 4, a structure of the encrypted data generation device 4 will be described.

The encrypted data generation device 4 includes an input/output section 41, an electronic data storage section 42, a key storage section 43, a session key generation section 44, and an encryption section 45.

The input/output section 41 performs input of electronic data, output of decrypted data, input of the broadly-defined user public key Upub, and input of the privileged user public key x·P. Further, the input/output section 41 receives information from the user through a keyboard or the like.

The electronic data storage section 42 stores electronic data provided from the input/output section 41. Further, the electronic data storage section 42 provides the stored electronic data to the encryption section 45.

The key storage section 43 has session key generation information s and a random point Q. The session key generation information s is an element of a cyclic multiplicative group Zq, and random point Q is an element of a cyclic group G. The session key generation information s and random point Q are provided to the session key generation section 44.

Further, the key storage section 43 stores the privileged user public key Ppub (=x·P) and broadly-defined user public key Upub (a set of the narrowly-defined user public key r·P and public key rx·P) that have been provided from the input/output section 41.

The session key generation section 44 uses the session key generation information s, random point Q, and public key rx·P that have been provided from the key storage section 43 to generate a session key K. The generated session key K is provided to the encryption section 45.

The encryption section 45 uses the session key K provided from the session key generation section 44 to encrypt the electronic data provided from the electronic data storage section 42.

The encrypted data is provided to the input/output section 41.

Operation of Embodiment

With reference to FIGS. 2 to 7, operation of the present embodiment will be described in detail.

Figure 5:
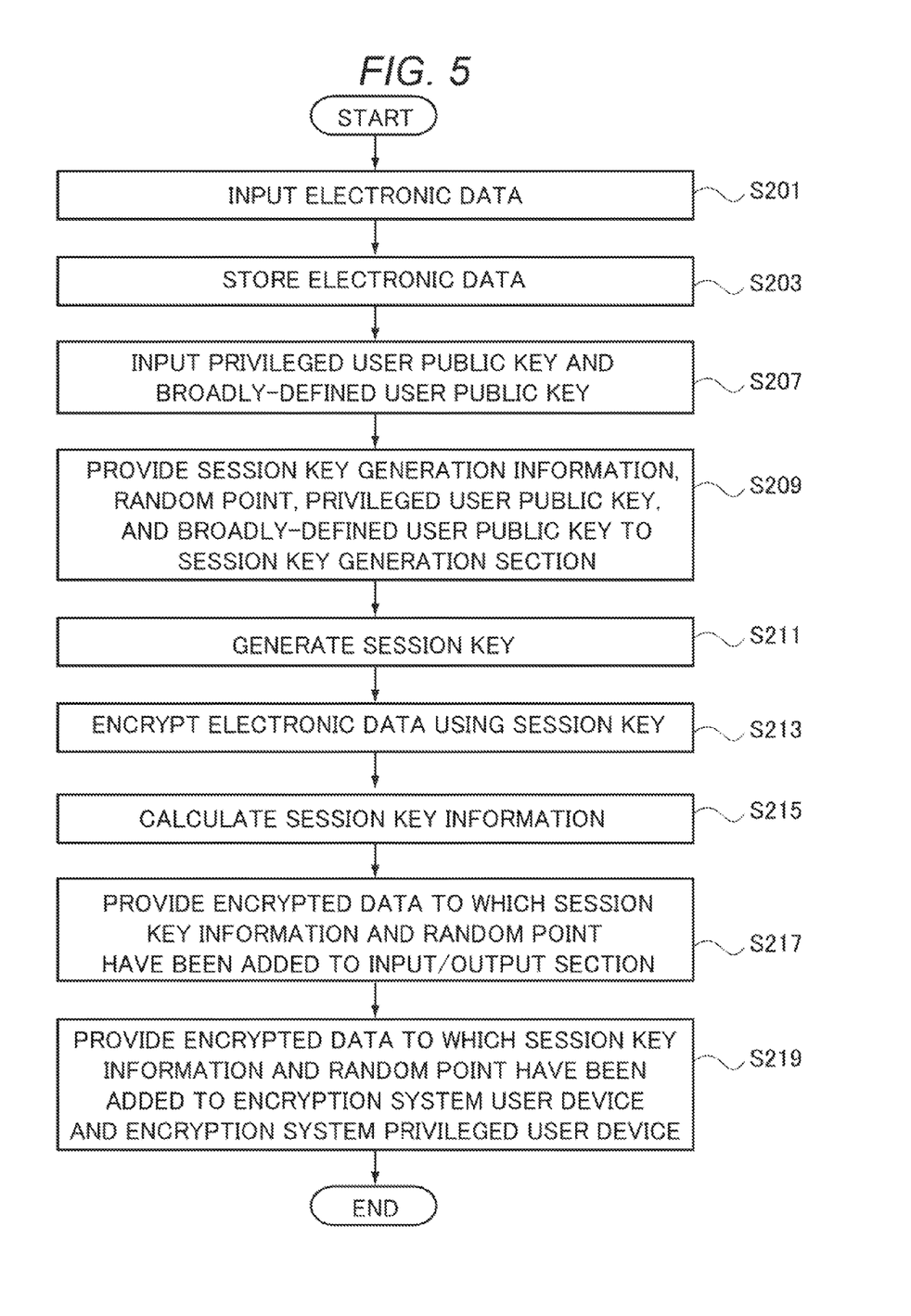
FIG. 5 A flowchart showing operation of the encryption system privileged user device shown in FIG. 1.

First, with reference to FIGS. 4 and 5, electronic data encryption operation performed by the encrypted data generation device 4 will be described in detail.

The input/output section 41 inputs therein electronic data (step S201).

The input/output section 41 stores the input electronic data in the electronic data storage section 42 (step S203).

The input/output section 41 inputs therein the privileged user public key Ppub and broadly-defined user public key Upub (step S205).

The input/output section 41 stores the input privileged user public key Ppub and broadly-defined user public key Upub in the key storage section 43 (step S207).

The key storage section 43 provides the session key generation information s, random point Q, privileged user public key Ppub and broadly-defined user public key Upub to the session key generation section 44 (step S209).

The session key generation section 44 uses the provided session key generation information s, random point Q, privileged user public key Ppub and user public key Upub to generate a session key K (step S211). The session key K is generated according to the following expression.

$$K = e(rx·P, s·Q) \qquad \text{[Numeral Expression 7]}$$

where e denotes bilinear pairs, r denotes a user secret key, x denotes a privileged user secret key, P denotes a generator of the above-mentioned privileged user public key Ppub, s is session key generation information, and Q is a random point.

The encryption section 45 acquires the electronic data from the electronic data storage section 42, acquires the session key K from the session key generation section 44, and encrypts the acquired electronic data using the acquired session key K (step S213).

The encryption section 45 calculates sx·P and sr·P as session key information from the session key generation information s, user public key r·P, and privileged user public key x·P (step S215).

The encryption section 45 provides encrypted data to which the session key information sx·P and sr·P and random point Q have been added to the input/output section 41 (step S217).

The input/output section 41 provides the encrypted data to which the session key information sx·P and sr·P and random point Q have been added to the input/output sections 21 and 31 of the encryption system user device 3 and encryption system privileged user device 2 (step S219).

Figure 6:
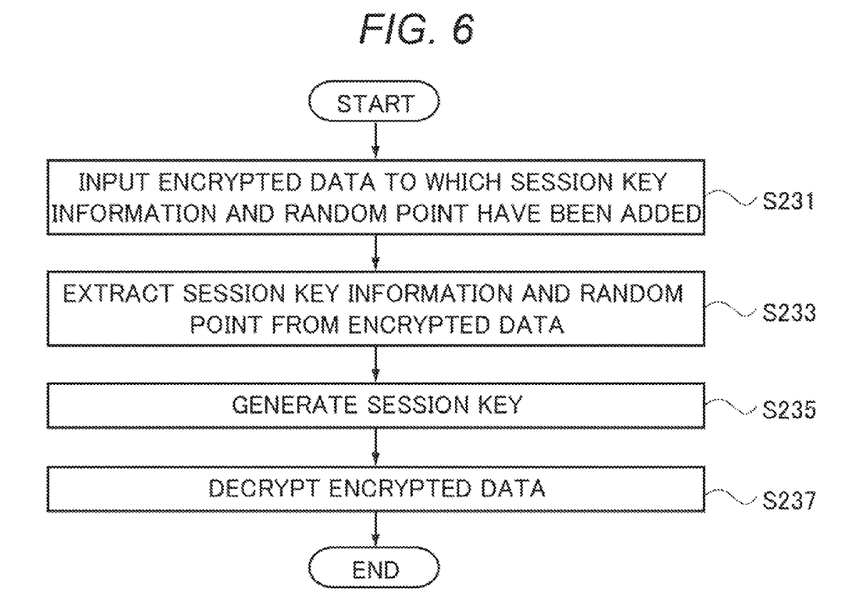
FIG. 6 A flowchart showing operation of the encryption system user device shown in FIG. 1.

Next, with reference to FIGS. 3 and 6, encrypted data decryption operation performed by the encryption system user device 3 will be described in detail.

The input/output section 31 inputs therein the encrypted data to which the session key information sx·P and sr·P and random point Q have been added from the input/output section 41 and provides them to the decryption section 35 (step S231).

The decryption section 35 extracts the session key information sx·P and sr·P and random point Q from the encrypted data to which the session key information sx·P and sr·P and random point Q have been added (step S233).

The extracted session key information sx·P and sr·P and random point Q are provided to the session key generation section 34.

The session key generation section 34 acquires the user secret key r from the key storage section 33 and uses the user secret key r, session key information sx·P and sr·P, and random point Q to generate a session key K (step S235).

K is generated according to the following expression.

$$K = e(sx·P, r·Q) \qquad \text{[Numeral Expression 8]}$$

where e denotes bilinear pairs, s is session key generation information, x denotes a privileged user secret key, P denotes a generator of the above-mentioned privileged user public key Ppub, r denotes a user secret key, and Q is a random point.

The session key generation section 34 provides the generated session key K to the decryption section 35.

The decryption section 35 uses the provided session key K to decrypt encrypted data (step S237). The decrypted electronic data is provided to the input/output section 31.

Figure 7:
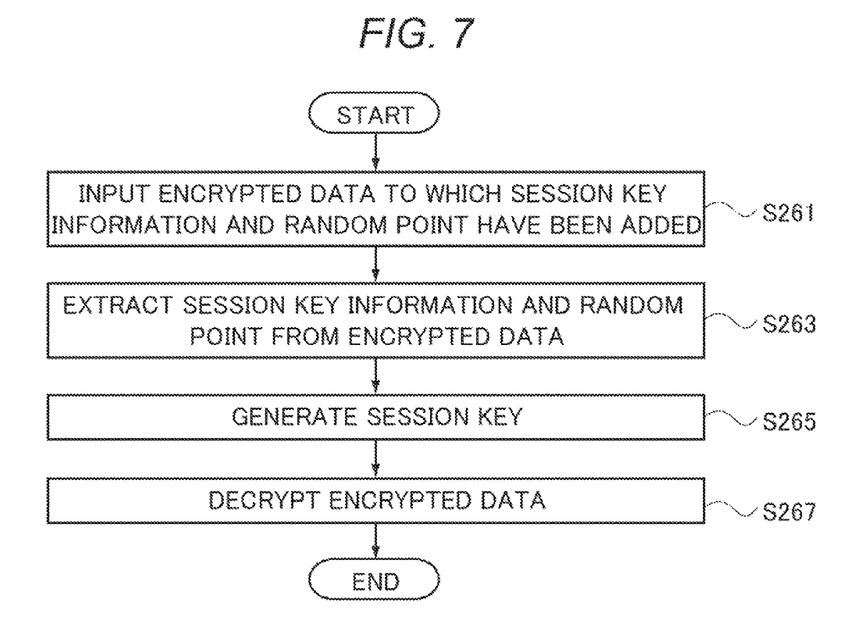
FIG. 7 A flowchart showing operation of an encrypted data generation device shown in FIG. 1.

Next, with reference to FIGS. 2 and 7, encrypted data decryption operation performed by the encryption system privileged user device 2 will be described in detail.

The input/output section 21 inputs therein the encrypted data to which the session key information sx·P and sr·P and random point Q have been added from the input/output section 41 and provides them to the decryption section 25 (step S261).

The decryption section 25 extracts the session key information sx·P and sr·P and random point Q from the provided encrypted data (step S263).

The extracted session key information sx·P and sr·P and random point Q are provided to the session key generation section 24.

The session key generation section 24 acquires the privileged user secret key x from the key storage section 23 and uses the privileged user secret key x, session key information sx·P and sr·P, and random point Q to generate a session key K (step S265).

K is generated according to the following expression.

$$K = e(sr·P, x·Q) \qquad \text{[Numeral Expression 9]}$$

where e denotes bilinear pairs, s is session key generation information, r denotes a user secret key, P denotes a generator of the above-mentioned privileged user public key Ppub, x denotes a privileged user secret key, and Q is a random point.

The session key generation section 24 provides the generated session key K to the decryption section 25.

The decryption section 25 uses the provided session key K to decrypt encrypted data (step S267). The decrypted electronic data is provided to the input/output section 21.

The encryption system privileged user device 2, encryption system user device 3, and encrypted data generation device 4 each can be realized by hardware, software or a combination thereof.

Further, as another embodiment, the encryption system user device 3 and encrypted data generation device 4 may be embodied as one device.

Effects

The first effect is that the privileged user can decrypt encrypted data.

The reason is that the public key of the privileged user and public key of a receiver of encrypted data are generated using a bilinear pairing technique, so that the secret key of the privileged user used for decryption can decrypt data that has been encrypted in any encrypted data generation device.

The second effect is to facilitate key management.

The encrypted data receiver can decrypt encrypted data only by using his secret key. Further, the privileged user can decrypt all encrypted data only by using his secret key.

Thus, the encrypted data receiver and privileged user each only need to manage one secret key for decryption.

Although the representative embodiment of the present invention has been described in detail, it should be understood that various changes, substitutions and alternatives can be made therein without departing from the sprit and scope of the invention as defined by the appended claims. Further, it is the inventor's intent to retain all equivalents of the claimed invention even if the claims are amended during prosecution.

INDUSTRIAL APPLICABILITY

The present invention can be applied for internal control of a company. In the case where an employee in a company transmits encrypted electronic data by mail, there is a possibility that he may encrypt confidential information of the company and improperly transmits it to others. In view of this, it is necessary to detect such an improper act of the employee of the company and prevent it. To this end, the encryption system according to the present invention has allowed all encrypted data to be decrypted with simple key management.

REFERENCE SIGNS LIST

2: Encryption system privileged user device
3: Encryption system user device
4: Encrypted data generation device
21: Input/output section
22: Privileged user key generation section
23: Key storage section
24: Session key generation section
25: Decryption section
31: Input/output section
32: User key generation section
33: Key storage section
34: Session key generation section
35: Decryption section
41: Input/output section
42: electronic data storage section
43: Key storage section
44: Session key generation section
45: Encryption section

The invention claimed is:

1. An electronic data encryption and decryption system comprising:
a privileged-user device, a user device and an encrypted data generation device, wherein the privileged-user device comprises:
a privileged-user key generation unit that generates a privileged-user secret key x and a privileged-user public key x·P, where P is a generator, and stores the privileged-user secret key and the privileged-user public key in a first key storage unit,
a first input/output unit that receives at least encrypted data from the encrypted data generation device and sends to the user device the privileged-user public key stored in the first key storage unit,
a first session key generation unit that generates a session key K based on bilinear pairing using the privileged-user secret key stored in the first key storage unit, and
a first decryption unit that decrypts the encrypted data by using the session key K generated by the first session key generation unit;
the user device comprises:
a second input/output unit that receives the privileged-user public key x·P from the privileged-user device, and receives at least the encrypted data from the encrypted data generation device,
a user key generation unit that generates a user secret key r, a user public key r·P, and a public key rx·P and stores the user secret key, the user public key and the public key in a second key storage unit,
a second session key generation unit that generates the session key K based on the bilinear pairing using the user secret key stored in the second key storage unit, and
a second decryption unit that decrypts the encrypted data by using the session key K generated by the second session key generation unit; and
the encrypted data generation device comprises:
a third input/output unit that receives from the user device at least the public key rx·P and stores the at least the public key in a third key storage unit,
a third session key generation unit that generates a session key K based on the bilinear pairing by using the public key rx·P, session key generation information s and a random point Q, which are stored in the third key storage unit, and
a unit that encrypts input electronic data using the session key K generated by the third session key generation unit.

2. The electronic data encryption and decryption system according to claim 1, wherein the first session key generation unit uses the following expression to generate the session key K:

$$K = e(sr \cdot P, x \cdot Q)$$ [Numeral Expression 10]

where e( ) denotes bilinear pairs, s is session key generation information, r denotes a user secret key, P denotes a generator, x denotes a privileged-user secret key, and Q is a random point.

3. The electronic data encryption and decryption system according to claim 1, wherein the second session key generation unit uses the following expression to generate the session key K:

$$K = e(sx \cdot P, r \cdot Q)$$ [Numeral Expression 11]

where e( ) denotes bilinear pairs, s is session key generation information, x denotes a privileged-user secret key, P denotes a generator, r denotes a user secret key, and Q is a random point.

4. The electronic data encryption and decryption system according to claim 1, wherein the third session key generation unit uses the following expression to generate the session key K:

$$K=e(rx \cdot P, s \cdot Q) \qquad \text{[Numeral Expression 12]}$$

where e( ) denotes bilinear pairs, r denotes a user secret key, x denotes a privileged-user secret key, P denotes a generator, s is session key generation information, and Q is a random point.

5. The electronic data encryption and decryption system according to claim 1, wherein session key information sx·P and sr·P and random point Q have been added to the encrypted data.

6. A privileged-user device comprising:
a privileged-user key generation unit that generates a privileged-user secret key x and a privileged-user public key x·P, where P is a generator, and stores the privileged-user secret key and the privileged-user public key in a key storage unit;
an input/output unit that receives at least encrypted data from an encrypted data generation device and sends to the user device the privileged-user public key stored in the key storage unit;
a session key generation unit that generates a session key K based on bilinear pairing using the privileged-user secret key stored in the key storage unit; and
a decryption unit that decrypts encrypted data by using the session key K generated by the session key generation unit, wherein the session key generation unit uses the following expression to generate the session key K:

$$K=e(sr \cdot P, x \cdot Q) \qquad \text{[Numeral Expression 13]}$$

where e( ) denotes bilinear pairs, s is session key generation information, r denotes a user secret key, P denotes a generator, x denotes a privileged-user secret key, and Q is a random point.

7. A user device comprising:
an input/output unit that receives from a privileged-user device a privileged-user public key x·P, where x is a privileged-user secret key and P is a generator, and receives at least encrypted data from an encrypted data generation device;
a user key generation unit that generates a user secret key r, a user public key r·³, and a public key rx·P and stores the user secret key, the user public key and the public key in a key storage unit, the generated user public key r·P and the public key rx·P being sent from the input/output unit to the encrypted data generation device;
a session key generation unit that generates a session key K based on bilinear pairing using the user secret key stored in the key storage unit; and
a decryption unit that decrypts the encrypted data sent from the encrypted data generation device by using the session key K generated by the session key generation unit.

8. The user device according to claim 7, wherein the session key generation unit uses the following expression to generate the session key K:

$$K=e(sx \cdot P, r \cdot Q) \qquad \text{[Numeral Expression 14]}$$

where e( ) denotes bilinear pairs, s is session key generation information, x denotes a privileged-user secret key, P denotes a generator, r denotes a user secret key, and Q is a random point.

9. An encrypted data generation device comprising:
an input/output unit that receives from a user device at least a public key rx·P, where r is a user secret key, x is a privileged-user secret key, and P is a generator, and stores the at least the public key in a key storage unit;
a session key generation unit that generates a session key K based on bilinear pairing using the public key rx·P, session key generation information s and a random point Q, which are stored in the key storage unit; and
a unit that encrypts input electronic data using the session key K generated by the session key generation unit, wherein the input/output unit sends the encrypted electronic data to the user device and a privileged user device.

10. The encrypted data generation device according to claim 9, wherein the key generation unit uses the following expression to generate the session key K:

$$K=e(rx \cdot P, s \cdot Q) \qquad \text{[Numeral Expression 15]}$$

where e( ) denotes bilinear pairs, r denotes a user secret key, x denotes a privileged-user secret key, P denotes a generator, s is session key generation information, and Q is a random point.

11. A non-transitory record medium on which a computer program is recorded, said computer program comprising instructions for having a computer function as a privileged-user device, the privileged-user device comprising:
a privileged-user key generation unit that generates a privileged-user secret key x and a privileged-user public key x·P, where P is a generator, and stores the privileged-user secret key and the privileged-user public key in a key storage unit;
an input/output that receives at least encrypted data from an encrypted data generation device and sends to the user device the privileged-user public key stored in the first key storage unit;
a session key generation unit that generates a session key K based on based on bilinear pairing using the privileged-user secret key stored in the key storage unit; and
a decryption unit that decrypts encrypted data by using the session key K generated by the session key generation unit, wherein the session key generation unit uses the following expression to generate the session key K:

$$K=e(sr \cdot P, x \cdot Q) \qquad \text{[Numeral Expression 16]}$$

where e( ) denotes bilinear pairs, s is session key generation information, r denotes a
user secret key, P denotes a generator, x denotes a privileged-user secret key, and Q is a random point.

12. A non-transitory record medium on which a computer program is recorded, said computer program comprising instructions for having a computer function as a user device, the user device comprising:
an input/output unit that receives from a privileged-user device a privileged-user public key x·P, where x is a privileged-user secret key and P is a generator, and receives at least encrypted data from an encrypted data generation device;
a user key generation unit that generates a user secret key r, a user public key r·P, and a public key rx·P and stores the user secret key, the user public key and the public key in a key storage unit, the generated user public key r·P and the public key rx·P being sent from the input/output unit to the encrypted data generation device;
a session key generation unit that generates a session key K based on bilinear pairing using the user secret key stored in the key storage unit; and
a decryption unit that decrypts the encrypted data sent from the encrypted data generation device by using the session key K generated by the session key generation unit.

13. The non-transitory record medium according to claim 12, wherein the session key generation unit uses the following expression to generate the session key K:

$$K=e(sx \cdot P, r \cdot Q)$$ [Numeral Expression 17]

where e( ) denotes bilinear pairs, s is session key generation information, x denotes a privileged-user secret key, P denotes a generator, r denotes a user secret key, and Q is a random point.

14. A non-transitory record medium on which a computer program is recorded, said computer program comprising instructions for having a computer function as an encrypted data generation device, the encrypted data generation device comprising:
  an input/output unit that receives from a user device at least a public key rx·P, where r is a user secret key, x is a privileged-user secret key, and P is a generator, and stores the at least the public key in a key storage unit;
  a session key generation unit that generates a session key K based on bilinear pairing using the public key rx·P, session key generation information s and a random point Q, which are stored in the key storage unit; and
  a unit that encrypts input electronic data using the session key K generated by the session key generation unit, wherein the input/output unit sends the encrypted electronic data to the user device and the privileged user device.

15. The non-transitory record medium according to claim 14, wherein the session key generation unit uses the following expression to generate the session key K:

$$K=e(rx \cdot P, s \cdot Q)$$ [Numeral Expression 18]

where e( ) denotes bilinear pairs, r denotes a user secret key, x denotes a privileged-user secret key, P denotes a generator, s is session key generation information, and Q is a random point.

16. An electronic data encryption and decryption method comprising:
  a privileged-user key generation step of generating a privileged-user secret key x and a privileged-user public key x·P;
  a first input/output step of receiving encrypted data
  a first session key generation step of generating a session key K based on bilinear pairing using the privileged-user secret key;
  a first decryption step of decrypting encrypted data by using the session key K generated by the first session key generation step;
  a second input/output step of receiving the privileged-user public key x·P, and receives at least the encrypted data
  a user key generation step of generating a user secret key r, a user public key r·P, and a public key rx·P;
  a second session key generation step of generating the session key K based on the bilinear pairing using the user secret key;
  a second decryption step of decrypting the encrypted data by using the session key K generated by the second session key generation step;
  a third input/output step of receiving at least a public key rx·P, where r is a user secret key, x is a privileged-user secret key, and P is the generator;
  a third session key generation step of generating a session key K based on bilinear pairing by using the public key rx·P, session key generation information s and a random point Q; and
  a step of encrypting input electronic data using the session key K generated by the third session key generation step.

17. The electronic data encryption and decryption method according to claim 16, wherein the first session key generation step uses the following expression to generate the session key K:

$$K=e(sr \cdot P, x \cdot Q)$$ [Numeral Expression 19]

where e( ) denotes bilinear pairs, s is session key generation information, r denotes a user secret key, P denotes a generator, x denotes a privileged-user secret key, and Q is a random point.

18. The electronic data encryption and decryption method according to claim 16, wherein the second session key generation step uses the following expression to generate the session key K:

$$K=e(sx \cdot P, r \cdot Q)$$ [Numeral Expression 20]

where e( ) denotes bilinear pairs, s is session key generation information, x denotes a privileged-user secret key, P denotes a generator, r denotes a user secret key, and Q is a random point.

19. The electronic data encryption and decryption method according to claim 16, wherein the third session key generation step uses the following expression to generate the session key K:

$$K=e(rx \cdot P, s \cdot Q)$$ [Numeral Expression 21]

where e( ) denotes bilinear pairs, r denotes a user secret key, x denotes a privileged-user secret key, P denotes a generator, s is session key generation information, and Q is a random point.

20. The electronic data encryption and decryption method according to claim 16, wherein session key information sx·P and sr·P and random point Q have been added to the encrypted data.

* * * * *